DETACHABLE TONE ARM MOUNTING

Filed Feb. 24, 1948

Inventors
Robert G. Bode
Charles A. Geib
By: Fred Gerlach Atty

Patented Feb. 7, 1950

2,496,693

UNITED STATES PATENT OFFICE 2,496,693

DETACHABLE TONE ARM MOUNTING

Robert G. Bode and Charles A. Geib, Chicago, Ill., assignors to The Norwood Company, Chicago, Ill., a corporation of Illinois Application February 24, 1948, Serial No. 10,424

2 Claims. (Cl. 274—23)

This invention has to do with portable phonographs and one of the principal objects is to provide a phonograph which can be housed within a small carrying case, together with a number of disc records, and wherein the tone arm and horn, including the sound box, can quickly and easily be detached and removed from its normal operating position and stowed in a suitable compartment where it cannot injure the records or itself be injured during transit.

Another object is to provide a small portable phonograph of the inexpensive mechanical type having no cumbersome horn, but rather one in which the tone arm serves as a horn, and wherein the output volume can easily be controlled by means of a hinged lid on the delivery end of the tone arm.

Still another object is to provide a combination tone arm and horn, having a hinged lid for regulating the output volume, and which is exceedingly cheap to manufacture—thus contributing materially to the production of a portable instrument which can be sold at a very low price and yet is capable of reproducing well enough and loud enough for dancing and beach party entertainment and the like, where maximum tone quality is not particularly important.

A further object is to provide an inexpensive universal mounting for the tone arm, which enables the latter to be easily and quickly detached from its normal position for stowing in the compartment provided for the purpose in the carrying case, and which further enables the tone arm to be quickly and easily set up for operation on a moment's notice.

An exemplary embodiment of the invention is illustrated in the accompanying drawing, wherein.

Figures 1, 2, 4, 5, 6:
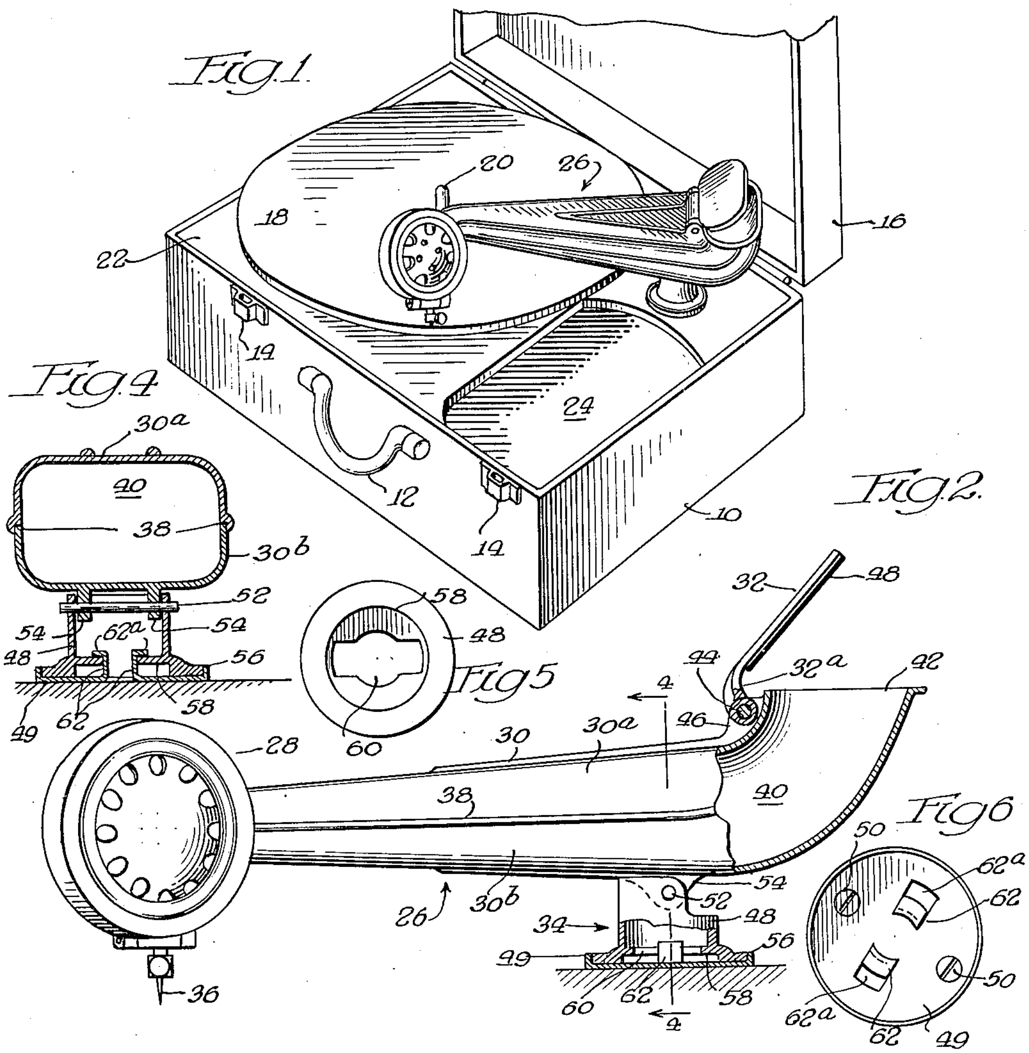
Fig. 1 is a perspective view of a portable phonograph in a carrying case—the case being shown open and the tone arm set up for operation.
Fig. 2 is an elevational view of the tone arm assembly including the sound-box and universal mounting, together with the hinged lid which serves to regulate the output volume.
Fig. 4 is a transverse section taken at line 4—4 of Fig. 2.
Figure 3:
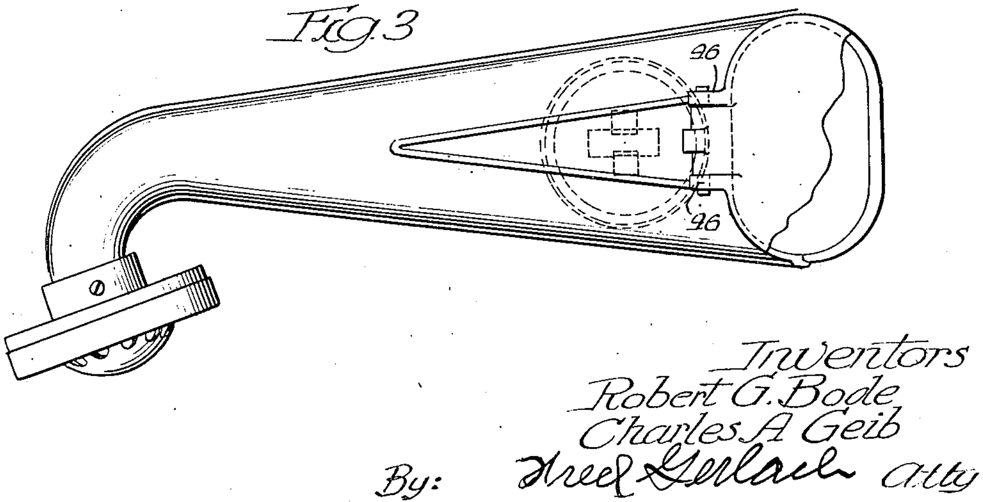
Fig. 3 is a top plan view of the tone arm, sound box and lid assembly.

Fig. 5 is a view from the under side of the rotatable standard forming a part of the universal mounting on which the tone arm is pivoted in the vertical plane and which serves as a means for pivoting the same for rotation in the horizontal plane, while enabling the tone arm assembly to be quickly detached and removed from its normal operating position, and re-attached with equal facility; and Fig. 6 is a plan view of the bearing plate forming a part of the universal mounting.

Referring more especially to Fig. 1, the portable phonograph therein illustrated comprises a rectangular carrying case 10 equipped with a bail 12 and latches 14 and provided with a hinged cover 16 which, when closed, serves to encase the entire phonograph mechanism as well as a number of disc records.

The phonograph includes a turntable 18 mounted on a spindle 20 and driven by a spring motor, not shown, which is disposed below the turntable within the carrying case.

The spindle 20 projects above the top surface of the turntable to receive several disc records, thus affording a convenient provision for transporting a supply of records with the phonograph. The distal end of spindle 20 preferably is so narrowly spaced from the cover 16, when the latter is closed, that the records cannot become detached in transit.

The carrying case is provided with a panel 22 which serves to conceal the motor mechanism and has an opening 24 leading into a compartment in which is stored the winding crank, not shown, and the tone arm assembly 26—which latter is shown on an enlarged scale in Figs. 2–6.

Tone arm assembly 26 comprises a sound box 28, a tone arm 30, a hinged lid 32, and a universal mounting identified as a whole by reference numeral 34.

The sound box is of conventional design, consisting of a housing which encloses an acoustic diaphragm arranged to be actuated by a stylus 36, which engages the record groove in the usual manner. The sound box is connected to the small end of the tone arm 30 and is movable both vertically and horizontally across the face of the record by virtue of the universal mounting 34.

Tone arm 30 consists of two complementary plastic mouldings 30*a* and 30*b* which are cemented together along the joint 38; and these form, conjointly, an acoustic passageway 40 which continuously increases in cross-sectional area in proceeding from the sound box to the open end at 42. Thus, the tone arm is designed to function as a horn and takes the place of the conventional large horn, use of which would defeat the primary object of the invention, which is to achieve the utmost compactness and portability. By making the combination tone arm and horn of two plastic mouldings cemented together, as above described, a major economy is realized, which contributes greatly to the possibility of turning out a very low-priced machine which is durable and in every way satisfactory.

An important feature of the invention resides in the lid 32, which is a plastic moulding and is hinged to the tone arm on a pin 44. The moulding 30*a* is formed with a pair of laterally spaced ears 46 which frictionally engage the sides of an arm 32*a* forming an integral part of lid 32, and said lid is thus held in any posture to which it may be adjusted. It is shown part way open in Figs. 1 and 2. A felt facing 48 is cemented to the surface of lid 32, partly for the purpose of damping the same against independent vibration and partly to render it silent when closed against the co-operating end of the tone arm. The output volume of the phonograph can be varied over a wide range by adjusting lid 32 between its fully closed and wide open positions.

The universal mounting 34 includes a standard 48, consisting of a hollow plastic moulding, and a metal bearing plate 49 which is secured, as by screws 50, Fig. 6, to the top of panel 22. The upper end of standard 48 is pivotally connected, by means of a pin 52, to a pair of depending lugs 54, constituting integral parts of tone arm moulding 30*b*, and said pin 52 is the fulcrum about which the tone arm is tiltable in the vertical plane, whereby to enable the sound box and stylus to be lifted off the record disc.

The bottom surface of standard 48 normally is seated and rotatable upon the upper surface of bearing plate 49 and is centered thereon by the upstanding peripheral flange 56 comprising a part of the bearing plate.

As shown most clearly in Fig. 5, the standard 48 has a bottom wall 58 through which is an elongate opening 60; and the bearing plate 49 is formed with a pair of upstanding lugs 62 which are dimensioned to pass through opening 60 when the tone arm is so positioned horizontally as to bring the lugs 62 into lengthwise registration with said opening. But said lugs 62 have oppositely projecting horizontal ears 62*a* at their respective upper ends, which ears are proportioned to overlie the top surface of wall 58 when the standard 48 is rotated, with the tone arm, away from the position wherein the lugs 62 and opening 60 are in lengthwise registration. Said lugs and opening are so mutually oriented that ears 62*a* overlie bottom wall 58 and thus serve to lock the tone arm to bearing plate 49 whenever the sound box is within the angle which it traverses in scanning a record. But the ears 62*a* do not interfere with free rotation of standard 48 on bearing plate 49. They simply prevent it being detached therefrom except when the tone arm is swung horizontally to an angular posture considerably removed from any posture in which the stylus can effectively engage the record groove. This provision enables the tone arm to be easily detached while at the same time ensuring against fortuitous detachment thereof during normal operation.

While we have described, by way of example, only one embodiment of our invention, it will be apparent that there are numerous possible modifications and alternatives within the purview thereof, and we do not wish to be limited otherwise than as indicated by the terms of the appended claims.

What is claimed is:

1. In a portable phonograph, a tone arm, a pick-up attached to one end of said tone arm, and a universal mounting pivotally supporting said tone arm near the other end thereof, said mounting including a bearing plate having a horizontal bearing surface and a pair of spaced lugs projecting upwardly from said bearing surface, each of said lugs having a horizontally extending ear at its upper end, said mounting also including a standard resting upon said bearing surface and rotatable horizontally, said standard having a bottom wall with a central elongate opening through which said lugs extend, said ears being adapted to overlie said bottom wall when said tone arm is within its operating sector, said ears being registerable with said opening so as to permit withdrawal of said standard from said bearing plate when said tone arm is turned horizontally to a certain position outside its operating sector, said tone being pivotally connected to said standard for rotation in the vertical plane.

2. In a portable phonograph, a tone arm, a pick-up attached to one end of said tone arm, and a universal mounting pivotally supporting said tone arm near the other end thereof, said mounting including a bearing plate and a standard resting upon said bearing plate and rotatable in the horizontal plane, said bearing plate having a circular upturned peripheral flange centering said standard, and a pair of integral upwardly projecting lugs, each having a horizontally projecting ear at its upper end, said standard having a bottom wall which is centrally apertured to pass said lugs and ears when said standard is rotated to a certain angular position, said ears being so disposed that they overlie said bottom wall and thus lock said standard to said bearing plate except when said standard is in said certain angular position.

ROBERT G. BODE.
CHARLES A. GEIB.

REFERENCES CITED

The following references are of record in the file of this patent:

UNITED STATES PATENTS

| Number | Name | Date |
|---|---|---|
| 715,237 | Baldwin | Dec. 9, 1902 |
| 805,823 | Lutz | Nov. 28, 1905 |
| 918,111 | Woods | Apr. 13, 1909 |
| 1,074,080 | Babson et al. | Sept. 23, 1913 |
| 1,734,172 | Madsen | Nov. 5, 1929 |
| 1,776,905 | Hinckley | Sept. 30, 1930 |
| 1,928,062 | Langley et al. | Sept. 26, 1933 |